US005652768A

United States Patent [19]
Ritter et al.

[11] Patent Number: 5,652,768
[45] Date of Patent: Jul. 29, 1997

[54] METHOD OF AND CIRCUIT ARRANGEMENT FOR DEMODULATING A DIGITAL AMPLITUDE-MODULATED CARRIER SIGNAL

[75] Inventors: Siegfried Ritter, Arnstadt; Wolfgang Tobergte, Halstenbek, both of Germany

[73] Assignee: U.S. Philips Corporation, New York, N.Y.

[21] Appl. No.: 523,065

[22] Filed: Sep. 1, 1995

[30] Foreign Application Priority Data

Sep. 3, 1994 [DE] Germany ............... 44 31 522.8

[51] Int. Cl.⁶ ............................................. H03D 1/24
[52] U.S. Cl. ...................... 375/320; 375/316; 329/308
[58] Field of Search ................... 375/320, 268, 375/300, 316, 261, 340, 326; 329/347, 349, 350, 353, 363, 364, 365, 360, 308, 358; 332/149; 455/108, 109, 203, 204

[56] References Cited

U.S. PATENT DOCUMENTS 4,253,189  2/1981  Lemoussu et al. ............ 375/320
4,484,154  11/1984  Pavin ............................. 329/347

*Primary Examiner*—Tesfaldet Bocure
*Assistant Examiner*—Bryan Webster
*Attorney, Agent, or Firm*—Michael J. Balconi-Lamica

[57] ABSTRACT

The demodulation of binary amplitude-modulated carrier signals gives rise to special problems, for example in the case of contactless data carriers, because the RF signal is then also used for generating the operating voltage which is limited to a fixed value when the energy is sufficiently high. Moreover, strong interference signals are often superposed on amplitude-modulated signals. For reliable demodulation in such circumstances, therefore, a control signal is subtracted from the input signal and the values of one polarity of the difference are integrated. In order to generate the control signal, the values of one polarity of a further difference between the input signal and a further control signal which is proportional to the former control signal are continuously integrated so as to form an integral signal which is periodically reduced by a fixed fraction. The control signals are derived from said integral signal in a non-linear fashion, preferably by way of the input characteristic of a transistor.

10 Claims, 2 Drawing Sheets

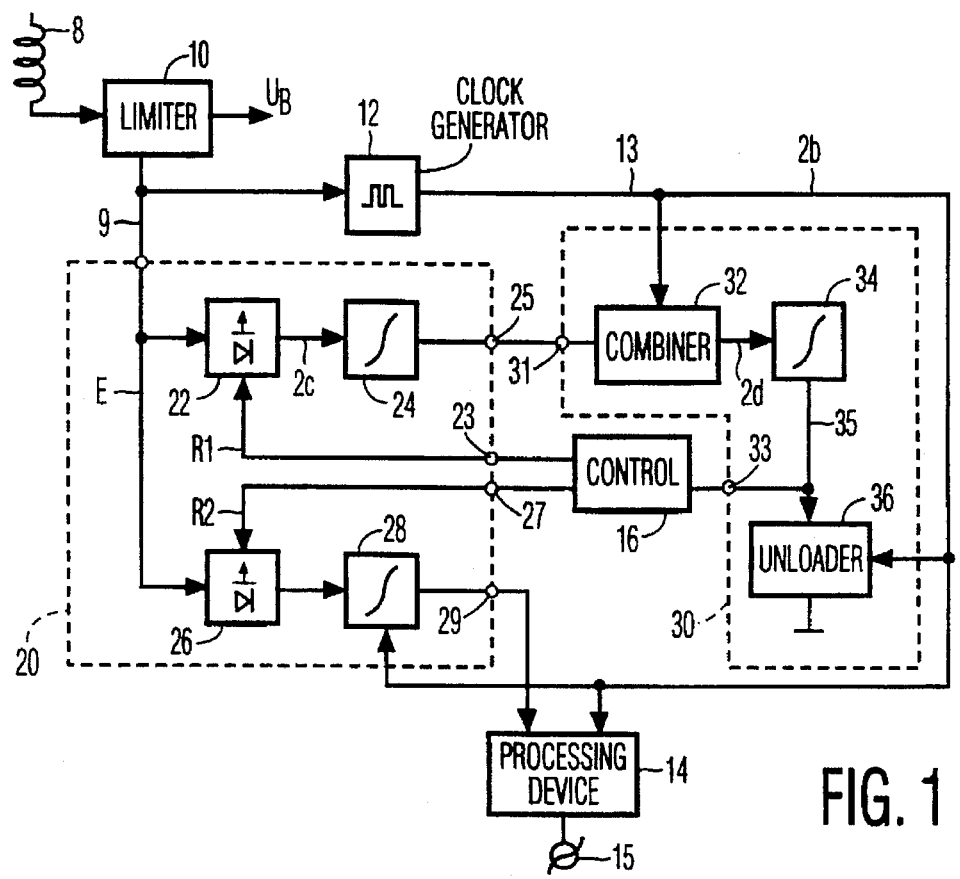
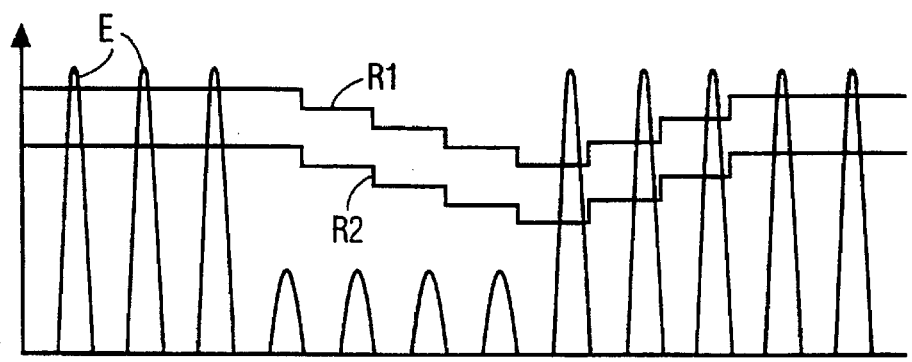
FIG. 2a
FIG. 2b
FIG. 2c
FIG. 2d 005,652,768

METHOD OF AND CIRCUIT ARRANGEMENT FOR DEMODULATING A DIGITAL AMPLITUDE-MODULATED CARRIER SIGNAL

BACKGROUND OF THE INVENTION

1. Field of the Invention

The invention in general relates to the demodulation of digital amplitude-modulated carrier signals, notably to such signals which are received with great differences in field strength.

2. Discussion of the Related Art

The demodulation of amplitude-modulated carrier signals of highly variable field strength takes place, for example in broadcast receivers. Therein, the signals are amplified by a variable-gain amplifier in such a manner that they exhibit approximately the same level for different incoming field strengths at the demodulator. This principle of variable or controlled amplification, however, cannot be used in some other cases.

An example in this respect is a data carrier which can be read and written in a contactless manner and which cooperates with a fixed base station which transmits a carrier signal whereby not only data for controlling notably the data carrier, but also the energy for operating the circuits provided in the data carrier are transferred. Therefore, as the received energy increases, for example due to a decreasing distance between the data carrier and the base station, the voltage output by the aerial must be limited to a maximum value. However, it is difficult to derive the information contained in the amplitude modulation from the limited aerial signal by demodulation in such a case. Moreover, amplitude-modulated carrier signals are very susceptible to interference.

SUMMARY OF THE INVENTION

It is an object of the invention to provide a method of demodulating a digital amplitude-modulated carrier signal which enables reliable and interference-resistant demodulation, even in the case of special secondary conditions such as, for example in the case of highly variating carrier signals with superposed interference.

In order to achieve this object, the method of demodulating a digital amplitude-modulated carrier signal in accordance with the invention comprises the following steps:

forming first difference values from differences of the one sign between a first control signal and auxiliary signals which are derived from every $n^{th}$ halfwave of the carrier signal, continuously integrating the first difference values so as to form a first integral, periodically reducing the first integral by a fixed fraction, controlling the first and at least one second control signal which is proportional thereto in a manner which is non-linearly dependent on the value of the first integral, forming second difference values from differences of the one sign between every second control signal and the auxiliary signals, integrating every second difference value separately so as to form at least one sequence of second integrals, generating at least one demodulated signal from a sequence of second integrals.

The formation of the integral of every second difference value, derived from the input signal, eliminates small disturbances, superposed on the input signal, to an extent which is far greater than in, for example, customary peak value demodulation. The input signal is then derived from every $n^{th}$ halfwave of the carrier signal, preferably from every second halfwave and hence from every halfwave of the same polarity of the carrier signal. Because the demodulated signal is formed from the integrated second difference values, the interference suppression is then also effective. During the formation of the control signals the interference suppression by integration is even more effective because an integral is then formed over a plurality of halfwaves of the carrier signal is then formed. The non-linear formation of the control signals from the value of the first integral is carried out via a threshold comparison in the ideal case; however, in practical cases it suffices to use an element with a threshold value and a curved input characteristic, for example a field effect transistor. The control signals are not complete but substantially independent of the strength of the input signal in that case. The first control signal is always adjusted so that the contribution of each first difference value to the first integral is equal to the fixed fraction whereby the first integral is reduced. Notably in the case of a strong carrier signal, the control signal is then also very large, so that a comparatively small difference is formed between two large values and the demodulation hence becomes very sensitive. This is particularly advantageous in the case of digital amplitude-modulated carrier signals.

In the simplest case of a binary amplitude modulation, where the carrier signal can thus assume one of only two values, the second control signal is chosen so that it is between these two values. This principle of the invention, however, can also be extended to a digital amplitude-modulated carrier signal where the carrier signal is switched between several values, for example between three or four different values. Several second control signals with different values between the individual relative values of the carrier signal, can then be used.

The contribution of each first auxiliary signal to the first integral is influenced inter alia by interference signals superposed on the carrier signal. In order to mitigate this effect, in a further embodiment of the invention each first difference value is separately integrated so as to form a third integral and the third integral is combined with the first integral after each auxiliary signal. Each third integral can then be readily limited to a maximum value, so that in the case of a disturbance on the carrier signal the first integral is only slightly falsified.

The formation of the third integral and its combination with the first integral should take place in different time segments so as to avoid mutual influencing. To this end, a version of the method of the invention is characterized in that the formation of the third integral and the combination with the first integral in different time segments is controlled by a clock signal which is derived from the carrier signal. This is the simplest way of ensuring that the formation of the third integral, determined by the carrier signal, takes place in synchronism with the combination of the two integrals in a temporally offset manner.

It is also an object of the invention to provide a circuit arrangement for demodulating a digital amplitude-modulated carrier signal which enables reliable demodulation with little interference even in the case of severe secondary conditions.

In order to achieve this object, the circuit arrangement in accordance with the invention for demodulating a digital amplitude-modulated carrier signal comprises an input circuit for generating at least one electric input signal from every $n^{th}$ halfwave of the carrier signal, a first subtraction stage for subtracting a first control signal from the input signals and for outputting first difference signals of the one sign, a first integrator for continuously integrating the first difference signals and for forming a first integral signal, unloading means for periodically reducing the first integral signal by a fixed fraction, first control means for forming the first and at least one second control signal from the first integral signal over a non-linear relationship, a second subtraction stage for subtracting the second control signal from the input signals and for outputting second difference signals of the one sign, at least one second integrator for the separate integration of every second difference signal and for forming second integral signals, second control means for deriving at least one demodulated signal from the second integral signals.

The first subtraction stage forms the difference between the first control signal and the input signal, which difference is continuously integrated so as to form a first integral signal wherefrom the control signal is formed in a non-linear fashion. This results in a control circuit which is on the one hand insensitive to interference and on the other hand sensitive to the amplitude modulation of the carrier signal. For the demodulation of a binary signal the second control signal is adjusted so as to be smaller than the first control signal, i.e. between this signal and the lower level of the modulated carrier signal. If a digital amplitude-modulated carrier signal having several levels is to be demodulated, a corresponding plurality of second control signals should be used. In that case a corresponding number of further subtracters and integrators will be required. Instead of generating different second control signals, however, it is also possible to derive different input signals of corresponding amplitude from the carrier signal and to use always the same second control signal.

The formation of difference signals of the one sign, for example the formation of exclusively positive difference signals, is realised either by suppressing difference signals of the other sign or by constructing the subtraction stages in such a manner that only the difference signals of the one sign are formed and output.

Embodiments of the circuit arrangement in accordance with the invention, notably the implementation of the subtraction stages, integrators and further elements, can be readily realised by means of capacitors and field effect transistors as disclosed in the dependent claims. In cases where the carrier signal is limited to a fixed maximum value by a circuit with a controlled load, as is the case for contactless data carders, the input signal is derived from the control signal of this load and hence is represented by a current. For such an implementation it is particularly attractive that all dynamic properties of the circuit, such as ratios of integrals or time constants, are dependent only on capacitances of capacitors or on properties of transistors which can be readily and reliably adjusted.

BRIEF DESCRIPTION OF THE DRAWINGS

Embodiments of the invention will be described in detail hereinafter with reference to the drawing. Therein:

FIG. 1 shows a block diagram of a circuit arrangement in accordance with the invention, FIGS. 2a–2d show a time diagram of various signals occurring in the block diagram of FIG. 1.

DETAILED DESCRIPTION OF THE PREFERRED EMBODIMENTS

Figure 3:
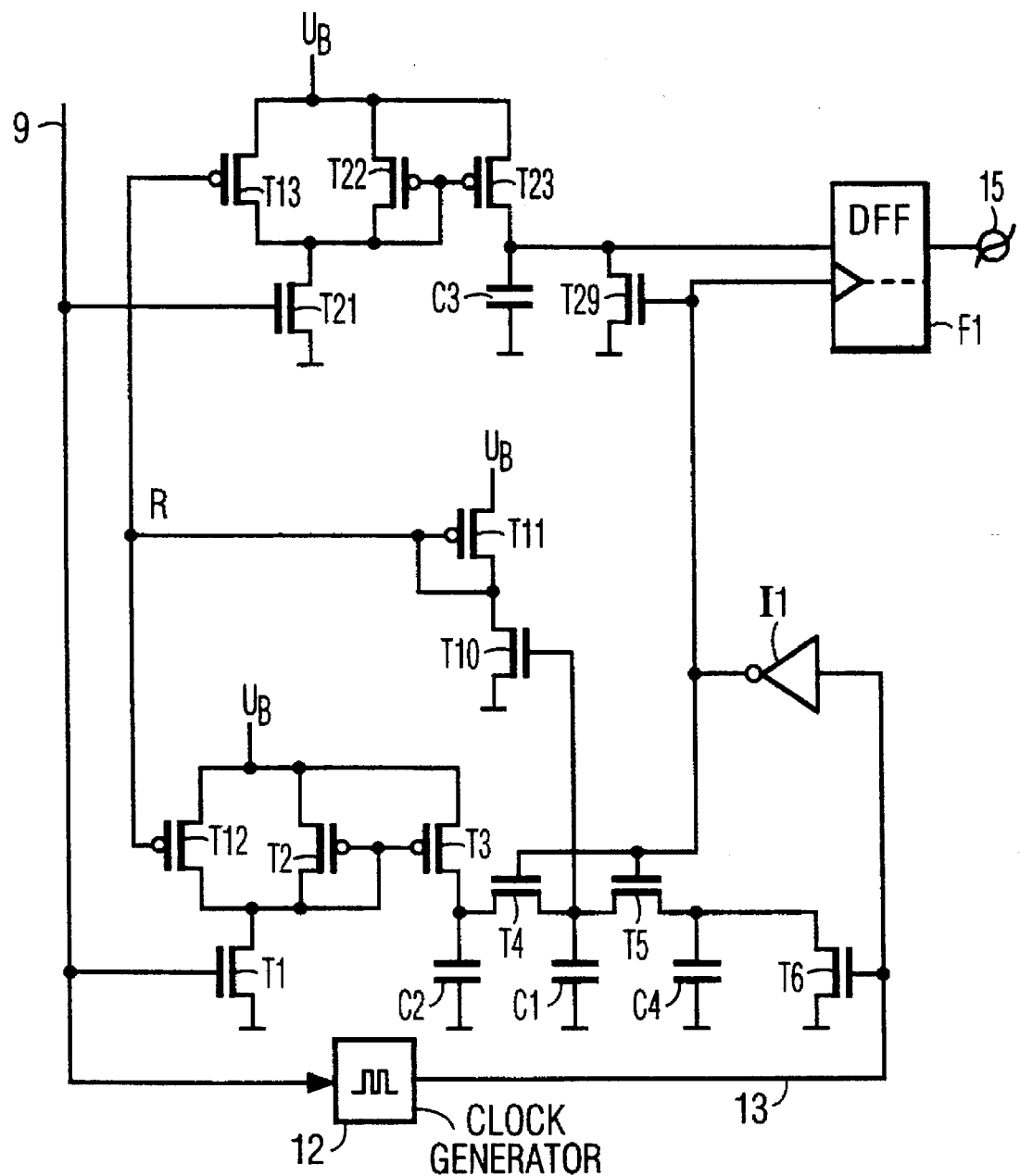
FIG. 3 shows the implementation of the blocks in the block diagram of FIG. 1 by means of capacitors and field effect transistors.

For a simple explanation, the examples described hereinafter relate to the demodulation of a binary amplitude-modulated carrier signal.

In FIG. 1 an aerial 8 which is constructed as a coil or a resonant circuit picks up a carrier signal which is applied to a device 10 in which the voltage from the aerial forms the operating voltage $U_B$ of an approximately constant value. To this end, for practical reasons the aerial voltage is limited by a limiter circuit which comprises essentially a controlled load as a partial short-circuit of the aerial voltage. The limiter circuit provides a voltage in proportion to the aerial voltage as an input signal 9 for further elements in the block diagram.

The circuit as shown in FIG. 1 comprises three integrators, which hereinafter will be referred to as: a filtering integrator 24, a control integrator 34, and a demodulation integrator 28. As will be discussed, the filtering integrator 24 is optional, and is provided to limit the effects of interference.

The circuit also contains two subtractors 22 and 26, which, as the symbol implies, are rectifying subtractors. As shown, they produce only a positive difference output, negative differences are suppressed.

This input signal 9 is applied to a first unit 20 which comprises the two rectifying subtracters 22 and 26 as well as two integrators 24 and 28. In the subtracter 22 a first control signal 23 is subtracted from the input signal, which control signal is supplied by a control circuit 16, and the difference between the two signals is filtered by the integrator 24. The filtered signal forms output 25 of the unit 20.

The output 25 is connected to an input 31 of a second unit 30. This unit comprises a combination device 32 and the control integrator 34. The combination device 32 is controlled by a clock signal on the lead 13 generated by a clock generator 12 which utilizes input signal 9 for this purpose. Each time when the combination device 32 is activated, it supplies the control integrator 34 with a value which is dependent on the signal on the input 31.

This can be realised in various ways, depending on how the filtered signal on the control output 25 is represented and how the integrator 34 is constructed. A particularly simple implementation of the combination device 32 will be described hereinafter with reference to FIG. 3.

The integral signal formed in the integrator 34 is applied, via the lead 35, to an unloading device 36 which is also controlled by the clock signal on the lead 13 and which subtracts each time a fraction of the integral signal therefrom.

The lead 35 is also connected to an output 33 of the second unit 30 which is connected to a control circuit 16. This circuit generates the first control signal 23 which is applied to the subtracter 22 in the first unit 20. In order to generate the control signal non-linearly dependently on the signal on the output 33, this signal is compared with a threshold value in the control circuit 16, so that a higher signal on the output 33 produces an essentially larger control signal. The difference formed by the subtracter 22 is thus reduced and hence also the signal supplied by the integrator 24 on the output 25, with the result that the second integrator 34 receives a signal which is smaller than that derived by the unloading device 36. When the control loop consisting of the control circuit 16, the first unit 20 and the integrator unit 30 has reached its operational state, the control signal has a value such that the first unit 20 supplies the control integrator 34 with a signal which is exactly as large as derived via the unloading device 36. This holds at least for the non-modulated case or in the case of binary amplitude modulation it holds essentially for the time segment with the higher input signal.

FIG. 2 shows an example of the variation in time of the input signal E, part of which is modulated, and of the control signal R1. Therein, only the positive halfwaves of the input signal E are shown, because the negative halfwaves are not processed or are processed by means of a further circuit of the same construction.

First there are shown three halfwaves corresponding to the carrier signal of full amplitude for which the control signal R1 has reached the steady state in which it is only slightly below the peak of the input signal E. The line b) represents a clock signal derived from the input signal. Line c) shows the difference values formed by the subtracter 22. Only positive difference values are formed; negative difference values are not formed or not processed. Line d) shows the integrals formed from the difference values of the line c) gated with the clock signal, as the output of combination device 32.

On line a) of FIG. 2 the fourth to seventh halfwave have been reduced to approximately 30% of the maximum value by modulation, so that they are below the control signal R1. As is shown on line c), positive difference values no longer occur and the control signal R1 is reduced, in response to each trailing edge of the clock signal shown on line b), in conformity with the reduction of the integral in the integrator 34 by the unloading device 36.

In response to the first halfwave which subsequently occurs with full amplitude, the eighth halfwave in FIG. 2, difference signals are produced again, i.e. difference signals of high value as shown on line c). These difference signals, supplied by the subtracter 22, form high integrals in the integrator 24, albeit not in proportion to the amplitude of the difference signal, because it is assumed that the integrator 24 has a saturation value. This is also a suitable step against any interference signals superposed on the carrier signals. The integral in the integrator 34 is increased by these integrals, so that the control signal R1 increases again. At the same time the subsequent difference signals, and hence the integrals formed therefrom, become increasingly smaller, until the steady-state condition occurs again.

When the input signal decreases in the modulated case, the positive difference formed by the subtracter 22 decreases more, comparatively speaking, or becomes equal to zero, as shown on line c) in FIG. 2, and hence also the signal generated by the integrator 24 on the output 25. The demodulated signal could thus be derived from this output 25. However, it must then be ensured that the signal on the output 25 is dependent only on the integration upon the respective last halfwave of the input signal and is set to zero again prior to the next integration. However, if the combination device 32 has a reactive effect on the output 25 and hence on the integrator 24, as is the case in the embodiment of the combination device 32 to be described hereinafter, the signal on the output 25 cannot be simply used.

Therefore, the first unit 20 in FIG. 1 comprises a second subtracter 26 and a further demodulation integrator 28 which is connected thereto. The subtracter 26 also receives the input signal and also, via an input 27, a further control signal R2 from the control circuit 16; this further control signal is shown on line a) in FIG. 2 so as to be slightly smaller in proportion to R1. Both control signals applied to the inputs 23 and 27 may in principle be equal, but that is a matter of practical embodiment. In the example shown in FIG. 1, the subtracter 26 thus receives a separate control signal so that on the output 29 the difference signal integrated by the demodulation integrator 28 produces an output signal of a level which is independent of that of the signal on the output 25. After every integration of a halfwave the signal of the integrator 28 is reset to an initial value, or the value zero, by the clock signal on the lead 13.

Because a steady signal is desirable for the demodulated signal, the output 29 is connected to a processing device 14 which, in the case of binary modulated signals, preferably comprises a binary storage member such as a flip-flop. This member takes over the signal state on the output 29 in response to each clock signal on the lead 13 and hence outputs a steady binary signal on the output 15.

The detailed circuit diagram shown in FIG. 3 comprises the implementations of different blocks of the block diagram of FIG. 1. Also provided are further elements which will be described hereinafter. The circuit of FIG. 3 is constructed using enhancement field effect transistors; a small circle in front of the gate of a transistor indicates that a p-type field effect transistor is concerned, whereas the other transistors are n-type field effect transistors.

The input signal on the lead 9, corresponding to the current in the limiter circuit for the aerial voltage, is applied to a transistor T1 which converts this signal into a current again. This signal current is applied to the drain of two parallel-connected transistors T2 and T12 whose source is connected to the operating voltage $U_B$. The gate of the transistor T12 receives a control signal from a circuit node R whereas the gate of the transistor T2 is connected to its drain and to the gate of a transistor T3 so that the transistors T2 and T3 fond a current mirror. The transistor T3 thus supplies a current which is equal to the difference between the current formed from the input signal by the transistor T1 and a control current supplied by the transistor T12. This difference current charges a capacitor C2. The transistors T2, T3 and T12 thus constitute the subtracter 22 of FIG. 1, whereas the capacitor C2 constitutes the filtering integrator 24.

The junction of the capacitor C2 and the transistor T3 is connected, via a further transistor T4, to one terminal of a capacitor C1 whose capacitance is substantially higher than that of the capacitor C2; this terminal is also connected, via a further transistor T5, to a terminal of a capacitor C4 whose capacitance is substantially lower than that of the capacitor C1. The two transistors T4 and T5 are controlled via an inverter I1, by the clock signals on the clock lead 13 supplied by a clock generator 12 which is connected to input signal 3 as has already been described with reference to FIG. 1. A further transistor T6 which is controlled directly by the clock signals on the lead 13 is connected parallel to the capacitor C4.

It is evident that the transistor T4 corresponds to the combination device 32 of FIG. 1, that the capacitor C1 corresponds to the control integrator 34 and that the capacitor C4 with the transistor T6 corresponds to the unloading device 36.

When a positive halfwave appears on the lead 9, the transistor T1 produces a signal current which charges the capacitor C2 in conformity with the input signal via the current mirror comprising the transistors T2 and T3. At the same time the capacitor C4 is discharged via the transistor T6. After this halfwave, the transistors T1 and T6 are turned off and the transistors T4 and T5 are turned on via the inverter I1 so that they connect all three capacitors C1, C2 and C4 to one another and all capacitors are charged to the same voltage; however, because of their different capacitances, they are charged to a different extent. In order to keep the voltage constant, as much charge must be supplied from the capacitor C2 to the capacitor C1 as there is charge extracted by the previously discharged capacitor C4.

The voltage across the capacitor C1 is applied to the gate of a transistor T10 whose drain is connected to the drain and the gate of a transistor T11. Therefore, this transistor T11 operates, in conjunction with the transistors T12 and T13, via the circuit node R as a current mirror having two current outputs. When the voltage across the capacitor C1 is so high that the transistor T10 is turned on and supplies a current, in dependence on the geometrical ratios of the transistors T11, T12 and T13 this current also appears on the outputs of the latter two transistors. The current generated by the transistor T12 is subtracted from the current of the transistor T1 as has already been explained. The transistor T10 herein constitutes the non-linear element for converting the voltage across the capacitor C1 into the control current.

The current produced by the transistor T13 is subtracted from the current of a transistor T21 which is controlled via input signal 9 and the difference is applied to a transistor T22 whose drain is connected to its own gate and to the gate of a transistor T23, so that the current difference appears on the output of the transistor T23 and charges a capacitor C3. For suitable demodulation of a binary modulated RF signal the voltage across the capacitor C3 should be as high as possible for one modulation value and as low as possible for the other modulation value. This is realised, for example in that the transistor T13 has a slightly smaller surface than the transistor T12 and hence supplies a small control current, so that the current difference in the subtracter formed by the transistor T21 and the transistor T13, or the current produced thereby and corresponding to the subtracter 26 in FIG. 1 is larger than the current difference produced by the transistors T1 and T12. Instead, the transistor T21 could also supply more current than the transistor T1 for the same input signal, or the capacitance of the capacitor C3 could be chosen to be smaller. In any case, it should be ensured that the capacitor C3 is fully charged for one value of the binary modulated carrier signal, until the transistor T23 is saturated, and that for the other modulation value of the carrier signal the current difference becomes negative, i.e. the transistor T22, and hence also the transistor T23, do not carry any current and the capacitor C3 is not charged at all.

The capacitor C3 is connected to the data input of a D-flipflop F1 and to reference potential via a transistor T29. After each charging of the capacitor C3, i.e. after each corresponding halfwave of the input signal 9, the clock signal on the lead 13 transfers the instantaneous signal state of the capacitor C3 to the flipflop F1, via the inverter I1, and at the same time, or slightly later, the transistor C3 is discharged via the capacitor T29 so that an unambiguous initial state arises prior to the next charging operation. When the same signal level of the modulated carrier signal, and hence the input signal 9, is present for several successive halfwaves, the flipflop F1 supplies a constant signal on the output 15.

The capacitor C1 could in principle be combined with the capacitor C2 and the transistor T4 could be replaced by a direct connection in order to produce the control signal or the control signals in the described manner. Such a configuration, however, would not be as resistant to interference as the described circuit arrangement, because interference in the amplitude modulated carrier signal, which must always be considered feasible, would substantially increase the voltage across the capacitor C1 very quickly. In the circuit arrangement shown, only the capacitor C2 is fully charged in the case of a disturbance, until the transistor T3 is saturated. In the case of a corresponding ratio of the capacitances of the capacitors C1 and C2, the maximum voltage variation across the capacitor C1 is then only small, so that the control loop is not disturbed.

It will be apparent from the foregoing that the dynamic properties of the circuit, notably the time constant of the control, are determined exclusively by the ratios of capacitance values of capacitors which can be manufactured with adequate accuracy. The non-linear characteristic of the relationship between the first integral, i.e. the voltage across the capacitor C1, and the control signal corresponding to the currents of transistors T12 and T13, is formed by the input characteristic of the transistor T10 which can also be manufactured with adequate accuracy. Notably no absolute reference values are required for the demodulation.

The foregoing description was given with reference to the demodulation of a binary amplitude-modulated carrier signal. In the case of digital modulation, for example a trivalent or a quadrivalent modulation, where the carrier can be reduced to two or three different values with respect to the instantaneous maximum value, a correspondingly larger number of second subtraction circuits and second integrators will be required.

The described circuit utilizes only the one halfwaves of the carrier signal. In order to increase the reliability, it is effective to utilize also the other, negative amplitudes of the carrier signal by utilizing a further, correspondingly constructed circuit. Because the limiter circuit must limit both halfwaves of the aerial signal, corresponding control signals are also available for both halfwaves and the control signal for the corresponding other halfwave of the carrier signal can be used for the additional circuit.

The invention claimed is:

1. A method of demodulating a digital amplitude-modulated carrier signal, said method comprising the steps of:

forming first difference values from the rectified differences between a first control signal and input signals derived from every $n^{th}$ halfwave of the carrier signal, continuously integrating the first difference values so as to form a control integral, periodically reducing the control integral, controlling the first control signal and at least one demodulation control signal which is proportional thereto in a manner which is non-linearly dependent on the value of the control integral, forming corresponding demodulation difference values from rectified differences between each demodulation control signal and the input signals, integrating each demodulation difference value separately so as to form corresponding sequences of demodulation integrals, and generating at least one demodulated signal from at least one sequence of demodulation integrals.

2. The method as claimed in claim 1, wherein each first difference value is filtered and further wherein the filtered first difference value is combined with the control integral after each input signal.

3. The method as claimed in claim 2, wherein the the combination of the filtered first difference value with the control integral in different time segments is controlled by a clock signal which is derived from the carrier signal.

4. A circuit arrangement for demodulating a digital amplitude-modulated carrier signal, comprising:
   an input circuit for generating at least one electric input signal from every $n^{th}$ halfwave of the carrier signal;
   a first subtraction stage for subtracting a first control signal from the input signals and for outputting rectified first difference signals;
   a control integrator for continuously integrating the first difference signals and for forming a control integral signal;
   unloading means for periodically reducing the control integral signal;
   at least one demodulation stage comprising:
      a rectifying subtractor for subtracting a corresponding demodulation control signal from the input signal to form a rectified demodulation difference signal,
      an integrator for integrating said demodulation difference signal to form a corresponding demodulation integral signal, and,
      a demodulation control means for deriving a corresponding demodulated signal from said demodulation integral signal;
   first control means for forming the first control signal and each of said demodulation control signals from the control integral signal over a non-linear relationship.

5. The circuit arrangement as claimed in claim 4, further comprising:
   means for filtering said first difference signals, and
   means for combining said filtered first difference signals with the control integral signal to adjust said control integral signal.

6. The circuit arrangement as claimed in claim 5, still further comprising:
   clock control means for generating a periodic clock signal from the carrier signal in order to control at least the unloading means and the combination means.

7. The circuit arrangement as claimed in claim 5, wherein the control integrator comprises a first capacitor and the filtering means comprises a second capacitor, and wherein a switch is provided for periodically connecting the first and the second capacitor in order to form the said combination of the filtered first difference signal and the control integral signal.

8. The circuit arrangement as claimed in claim 7, further wherein the first capacitor is coupled, via a non-linear input characteristic of a field effect transistor, to a control input of a first current mirror in order to generate at least one first control current on a first control current output, of a value which is non-linearly dependent on the charge across the first capacitor, wherein further there is provided a first current generator with a control input for the input signal in order to generate, on an output of the first current generator, a current of a value which is dependent on the input signal and whose direction opposes the direction of the first control current, and wherein still further the output of the first current generator is connected to the first control current output and to a control input of a second current mirror whose current output is connected to the first capacitor.

9. The circuit arrangement as claimed in claim 8, wherein the first and the second current mirror consist of field effect transistors of a first conductivity type and the first current generator consists of a field effect transistor of a second conductivity type.

10. The circuit arrangement as claimed in claim 8, wherein the first current mirror is arranged to generate a second control current on a second control current output, further wherein the second integrator comprises a third capacitor, wherein the second subtracter comprises:
    a second current generator having a control input for the input signal and a current output for supplying a signal current, and
    a third current mirror having a control input which is connected to the output of the second current generator and to the second control current output, and an output which is connected to the third capacitor, and wherein the second control means is connected to the third capacitor.

* * * * *